(12) United States Patent
Tung et al.

(10) Patent No.: US 8,597,410 B2
(45) Date of Patent: Dec. 3, 2013

(54) DYNAMIC HYDROGEN-STORAGE APPARATUS AND THE METHOD THEREOF

(75) Inventors: Cheng-Hsiang Tung, Taoyuan County (TW); Ming-Sheng Yu, Taipei (TW); Hsiu-Chu Wu, Pingtung County (TW); Huan-Hsiung Tseng, Miaoli County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 237 days.

(21) Appl. No.: 13/167,149

(22) Filed: Jun. 23, 2011

(65) Prior Publication Data
US 2012/0100065 A1 Apr. 26, 2012

(30) Foreign Application Priority Data
Oct. 26, 2010 (TW) .................................. 99136463 A

(51) Int. Cl.
*F17C 11/00* (2006.01)
*B01D 53/02* (2006.01)

(52) U.S. Cl.
USPC ................................ 95/116; 96/115; 502/526

(58) Field of Classification Search
USPC ................ 95/19, 116; 96/108, 113, 115; 423/648.1; 502/526; 429/515
See application file for complete search history.

(56) References Cited

U.S. PATENT DOCUMENTS

| | | | | |
|---|---|---|---|---|
| 4,173,625 A | * | 11/1979 | Billings | 423/648.1 |
| 5,460,745 A | * | 10/1995 | Lee | 252/182.32 |
| 7,901,491 B2 | * | 3/2011 | Zhao et al. | 96/108 |
| 8,182,582 B2 | * | 5/2012 | Yu et al. | 95/90 |
| 2005/0148466 A1 | * | 7/2005 | Lemmon et al. | 502/416 |
| 2008/0156392 A1 | * | 7/2008 | Kohno | 141/4 |
| 2010/0019196 A1 | * | 1/2010 | Yang et al. | 252/188.25 |
| 2011/0252962 A1 | * | 10/2011 | Von Helmolt et al. | 95/15 |

* cited by examiner

*Primary Examiner* — Frank Lawrence, Jr.
(74) *Attorney, Agent, or Firm* — WPAT, PC; Justin King

(57) ABSTRACT

This invention provides a dynamic hydrogen-storage apparatus and the method thereof, which includes the following steps: (a) filling a container with a porous hydrogen-storage material which is loaded or doped with a catalyst; (b) setting an operational pressure and a pressure drop for the operation of storing hydrogen; (c) providing the hydrogen-storage material with a hydrogen so as to increase the pressure of the hydrogen to the operational pressure; (d) decreasing the pressure of the hydrogen by the pressure drop; and (e) repeating steps (c) and (d) for a predetermined amount of times.

17 Claims, 3 Drawing Sheets

DYNAMIC HYDROGEN-STORAGE APPARATUS AND THE METHOD THEREOF

TECHNICAL FIELD

The present invention relates to a hydrogen-storage technique, and more particularly, to a hydrogen-storage method and a hydrogen-storage apparatus for storing hydrogen with dynamic increase and decrease of the hydrogen pressure.

TECHNICAL BACKGROUND

Energy resources are essential for industrialization of a modern nation. After the exploitation of petroleum for centuries, people have to face the facts of energy shortage and environmental climate change. Hydrogen, which sources from inexhaustible water, is regarded as one of the promising candidates. Utilizing hydrogen as an energy resource, the produced output of the hydrogen processing is water, without any side product of $CO_2$, the major cause of global warming. Hydrogen energy can be one of high-efficiency energy resources that meet the requirement of environmental protection, and will become one of main green energy resources in the near future. However, the key puzzle in the hydrogen-related technique is the storage of hydrogen. One of safe and efficient solutions is to adsorb or seal hydrogen molecules in hydrogen-storage material by means of particular bonding between the hydrogen molecules and the hydrogen-storage material.

The sorption-type one is perhaps the most potential hydrogen-storage material. It is composed of carbon based material with high specific surface area, such as activated carbon, nano carbon tube, metal-organic framework (MOF), and so on. Nowadays, catalyst doped on porous materials seems to be promising, of which hydrogen storage capacity has been enhanced through the spillover effect.

However, the storage capacity of such substances is still not well-satisfied. Static storage methods have been used in the prior-art hydrogen storage techniques, wherein the hydrogen pressure is kept the same in the storage process. In the case, the hydrogen storage efficiency may be limited due to the decreasing of activity of catalyst and the decreasing of concentration gradient with time. Therefore, it is in need of a more trustworthy hydrogen-storage technique for the hydrogen-energy applications.

TECHNICAL SUMMARY

It is an object of the present invention that an alternating process of increase and decrease of the pressure of hydrogen applied to hydrogen-storage material to improve the hydrogen storage capacity thereof, whereby activity of catalyst maintains high and hydrogen concentration with time keeps constant while the heat accumulation can be avoided in the hydrogen-storing process.

According to one aspect of the present invention, one embodiment provides a method for storing hydrogen which includes the following steps: (a) filling a container with a porous hydrogen-storage material which is loaded or doped with a catalyst; (b) setting an operational pressure and a pressure drop for the operation of storing hydrogen; (c) providing the hydrogen-storage material with a hydrogen so as to increase the pressure of the hydrogen to the operational pressure; (d) decreasing the pressure of the hydrogen by the pressure drop; and (e) repeating steps (c) and (d) for a predetermined amount of times.

According to another aspect of the present invention, another embodiment provides a hydrogen storage apparatus which includes a container having a pressure resistance of more than 1050 psi and filled with a porous hydrogen-storage material which is loaded or doped with a catalyst; a first gas passage coupled to the container to input a hydrogen into the container; a second gas passage coupled to the container to drain the hydrogen out of the container; a first pressure adjuster disposed in the first gas passage to increase or decrease the pressure of the hydrogen in the container; and a controlling means operating the apparatus and connected to the first pressure adjuster so as to control the pressure of the hydrogen in the container.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For further understanding and recognizing the fulfilled functions and structural characteristics of the disclosure, several exemplary embodiments cooperating with detailed description are presented as the following.

Figure 1:
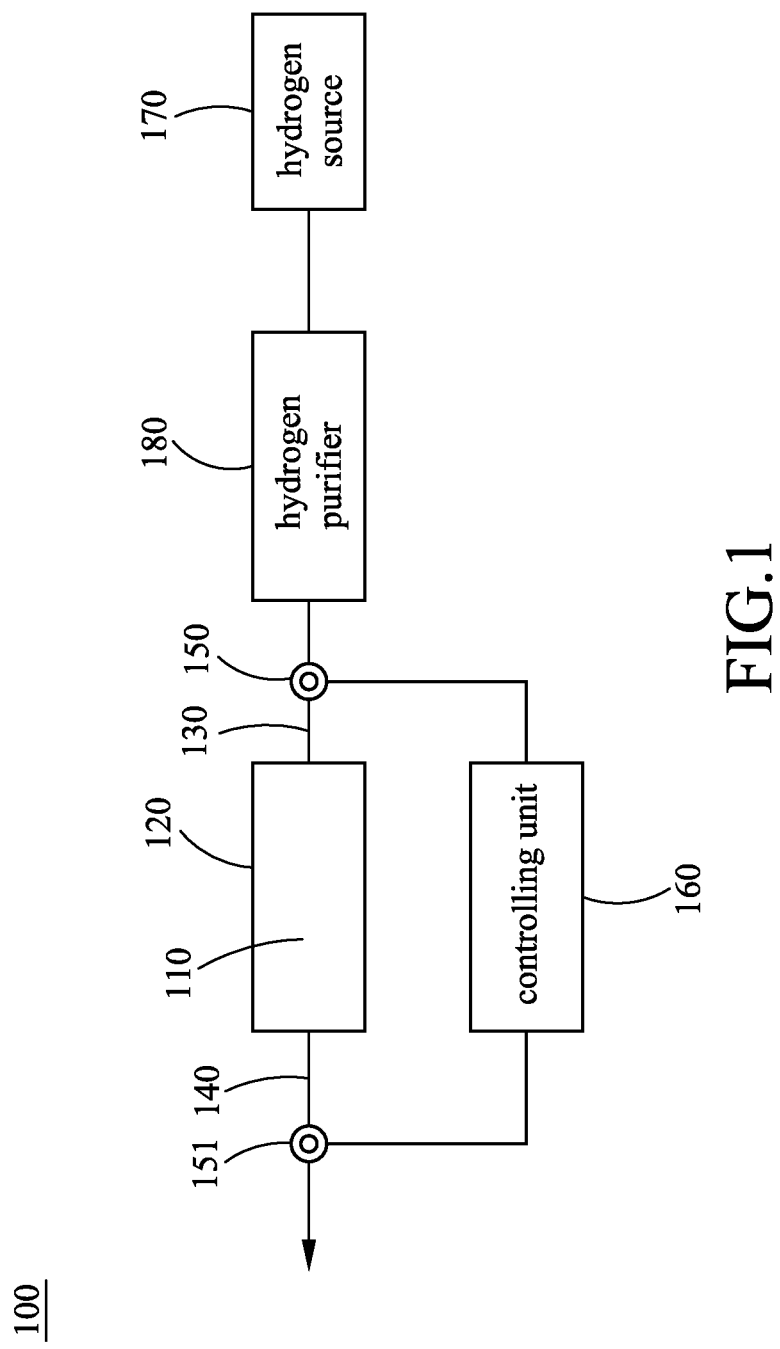
FIG. 1 shows schematically a block diagram of a hydrogen-storage apparatus according to an embodiment of the present invention.

FIG. 1 shows schematically a block diagram of a hydrogen-storage apparatus 100 according to an embodiment of the present invention. Referring to FIG. 1, the hydrogen-storage apparatus 100 includes a container 120 filled with a porous hydrogen-storage material 110, a first gas passage 130, a second gas passage 140, a first pressure adjuster 150, and a controlling unit 160. To provide high-quality hydrogen, a hydrogen source 170 with a hydrogen purifier 180 is disposed in front of the first gas passage 130 and the first pressure adjuster 150. The first pressure adjuster 150 is disposed in the first gas passage 130 to increase the pressure of the hydrogen in the container 120. The hydrogen is introduced into the container 120 and the porous hydrogen-storage material 110 therein through the first gas passage 130. The hydrogen which is introduced into the container 120 but not absorbed or stored by the porous hydrogen-storage material 110 can be drained out of the container 120 through the second gas passage 140. The drained hydrogen is recyclable and may be reused. A second pressure adjuster 151 may be disposed in the second gas passage 140 to decrease the pressure of the hydrogen in the container 120. The first pressure adjuster 150 and the second pressure adjuster 151 are electrically connected to the controlling unit 160, respectively, so as to adjust the pressure of the hydrogen in the container 120.

To bear the high pressure due to the constant introduction of the hydrogen into a small container, the container 120 is required to have a pressure resistance which is larger than the maximum pressure of the hydrogen flowing in the hydrogen-storage apparatus 100. In the embodiment, a so-called hydrogen-storage box with a pressure resistance of more than 1050 psi serves as the container 120.

The container 120 is filled with the porous hydrogen-storage material 110. The porous hydrogen-storage material 110 is loaded or doped with a catalyst so as to facilitate absorption and storage of the hydrogen. In this embodiment, the hydrogen-storage material 110 is activated carbon and the catalyst is made of platinum (Pt). However, it is not limited thereby; the porous hydrogen-storage material 110 can be nano carbon tube or the like porous material with a corresponding catalyst for hydrogen absorption.

The hydrogen is purified by the hydrogen purifier 180 and then sent into the first gas passage 130 which is coupled to the container 120. The first pressure adjuster 150 is disposed in the first gas passage 130 and controlled by the controlling unit 160 to introduce the hydrogen and, hence, to adjust the pressure of the hydrogen in the container 120. The second pressure adjuster 151 is disposed in the second gas passage 140 and also controlled by the controlling unit 160 to drain the hydrogen not absorbed or stored by the porous hydrogen-storage material 110 out of the container 120 and, hence, to adjust the pressure of the hydrogen therein.

The hydrogen-storage apparatus 100 may further include a heat exchanger (not shown) which maybe electrically connected to the controlling unit 160, whereby the container 120 operates in a temperature range of 10 to 300° C. according to the practical requirements, and 15 to 30° C. is the temperature range of best mode in the present embodiment.

The controlling unit 160 is used to control the first pressure adjuster 150, the second pressure adjuster 151, and the heat exchanger, so that operational conditions of the pressure and temperature of the hydrogen in the container 120 can be programmed. For example, an operational pressure and a pressure drop can be designated to the controlling unit 160, so that the controlling unit 160 operates the hydrogen-storage apparatus 100 to increase the pressure of the hydrogen in the container 120 to the operational pressure, decrease the pressure of the hydrogen by the pressure drop, and repeat the increase and decrease of the pressure for a predetermined amount of times. Preferably, the operational pressure is set between 950 psi and 1050 psi, and the pressure drop is between 5 psi and 550 psi. But it is not limited thereby, the operational pressure may be more than 700 psi and the pressure drop may be less than 700 psi.

Figure 2:
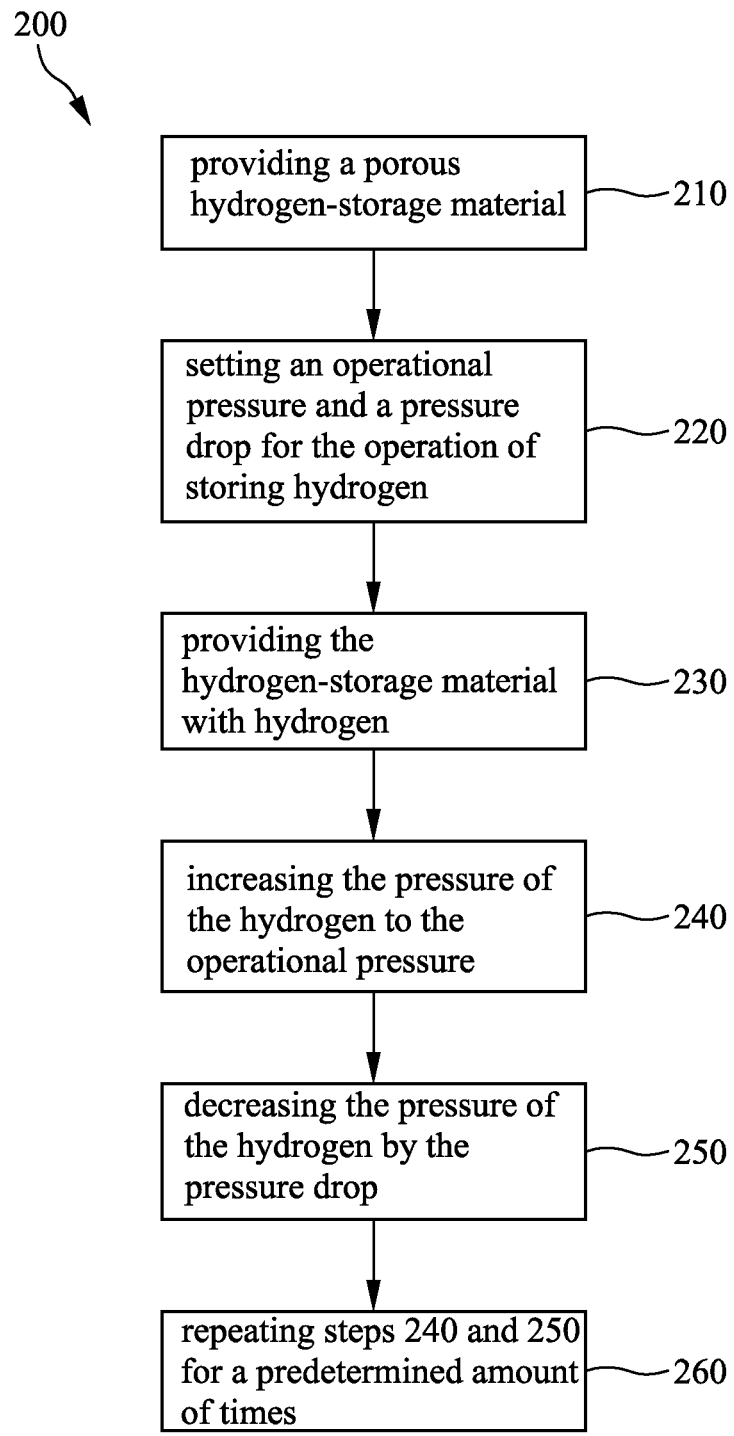
FIG. 2 shows schematically a flowchart of a method for storing hydrogen according to the embodiment of the present invention.

The operational process of the hydrogen-storage apparatus 100 can be described with the following embodiment according to the present invention. FIG. 2 shows schematically a flowchart of a method for storing hydrogen according to the embodiment. Referring to FIGS. 1 and 2, the method 200 includes the following steps. In step 210, a container 120 and a porous hydrogen-storage material 110 loaded with a catalyst are provided, and the container 120 is filled with the hydrogen-storage material 110. In step 220, an operational pressure and a pressure drop for the operation of storing hydrogen are designated to the controlling unit 160 so that the controlling unit 160 can manage the hydrogen-storage apparatus 100. In step 230, the hydrogen-storage material 110 is provided with hydrogen. In step 240, the pressure of the hydrogen in the container 120 is increased to the operational pressure. In step 250, the pressure of the hydrogen is reduced by the pressure drop. In step 260, steps 240 and 250 are repeated for a predetermined amount of times.

Figure 3:
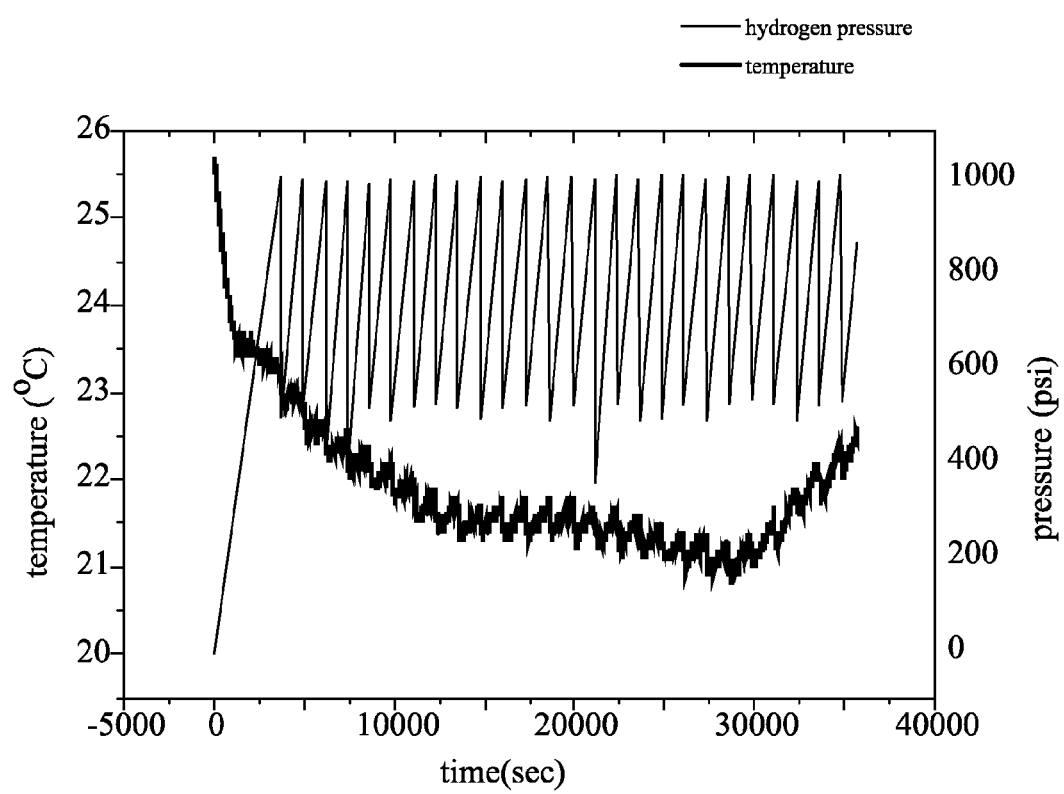
FIG. 3 is the measured pressure and temperature of the hydrogen for the AC/Pt hydrogen-storage material in the container.

In the following exemplary embodiment, activated carbon (AC) of 5.9 gram is used as the hydrogen-storage material with platinum (Pt) loaded therein as the catalyst. The operational pressure is set at 1000 psi while the pressure drop is 500 psi. The controlling unit 160 manages the operational pressure and temperature of the hydrogen in the container 120 in a manner that the temperature is kept between 12 to 24° C., the first pressure adjuster 150 is for the increase of the pressure, and the second pressure adjuster 151 is for the decrease of the pressure. At first, the first pressure adjuster 150 is activated to introduce the hydrogen from the hydrogen source 170 into the container 120 and, accordingly, the pressure is increased to 1000 psi. Then the first pressure adjuster 150 is closed and the second pressure adjuster 151 is activated to drain the hydrogen from the container 120 and, accordingly, the pressure is reduced to 500 psi. Next the second pressure adjuster 151 is closed and the first pressure adjuster 150 is activated again to introduce the hydrogen into the container 120 to increase the pressure to 1000 psi. The increase and decrease of the pressure are performed for 26 times, and the whole process may take 20 hours. The pressure and temperature of the hydrogen for the AC/Pt hydrogen-storage material in the container 120 is measured as shown in FIG. 3. The resultant hydrogen storage of 1.933 wt. % can be obtained in the embodiment. In a comparative prior art, the hydrogen-storage material of AC is the same as the foregoing embodiment while the hydrogen storage process is performed at a constant (but not dynamic) hydrogen pressure of 1000 psi for 20 hours. The hydrogen storage of 0.4 wt. % was reported in the prior art. Compared to the prior art, the hydrogen storage process with alternating increase and decrease of the hydrogen pressure in the embodiment according to this present invention can improve the hydrogen adsorption or storage efficiency by 5 times over the conventional method and pure AC. TGA test also indicates that the hydrogen storage capacity can reach up to 9 wt % at room temperature and pressure 6.9 MPa when applied this dynamic charging mode.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for increasing hydrogen storage capacity of a porous hydrogen storing material comprising the following steps:
   (a) providing a container with a porous hydrogen-storage material which is loaded or doped with a catalyst;
   (b) setting a high charging pressure and a low charging pressure for charging hydrogen;
   (c) charging the container with hydrogen to said high charging pressure;
   (d) decreasing the pressure of hydrogen in said container to said low charging pressure; and
   (e) alternating between said high charging pressure and said low charging pressure within said container by repeating steps (c) and (d) for a predetermined amount of times.

2. The method of claim 1, wherein said hydrogen-storage material comprises activated carbon and said catalyst comprises platinum (Pt).

3. The method of claim 1, wherein said container has a pressure resistance of more than 1050 psi.

4. The method of claim 1, wherein steps (c), (d), and (e) are operated in a temperature range of 10 to 300° C.

5. The method of claim 1, wherein said high charging pressure is more than 700 psi.

6. The method of claim 5, wherein said high charging pressure is between 950 psi and 1050 psi.

7. The method of claim 1, wherein said low charging pressure is 700 or less psi lesser than said high charging pressure.

8. The method of claim 7, wherein said low charging pressure is between 5 psi and 550 psi lesser than said high charging pressure.

9. An apparatus for dynamic hydrogen storage comprising:
- a container filled with a porous hydrogen-storage material which is loaded or doped with a catalyst;
- a first gas passage coupled to said container to input hydrogen into said container;
- a second gas passage coupled to said container to drain the hydrogen out of said container;
- a first pressure adjuster disposed in the first gas passage to increase the pressure of the hydrogen in the container; and
- a controlling means operating the apparatus and connected to the first pressure adjuster for adjusting said container's pressure, wherein said controlling means is configured to alternate said container's pressure between a high charging pressure and a low charging pressure for a predetermined amount of times for increasing the hydrogen storage capacity of said porous hydrogen storage material.

10. The apparatus of claim 9, further comprising a second pressure adjuster disposed in the second gas passage to decrease the pressure of the hydrogen in the container.

11. The apparatus of claim 9, further comprising a heat exchanger so that the container is operated in a temperature range of 10 to 300° C.

12. The apparatus of claim 9, wherein said hydrogen-storage material comprises activated carbon and said catalyst comprises platinum.

13. The apparatus of claim 9, wherein said higher charging pressure and said lower charging pressure are predetermined in said controlling means.

14. The apparatus of claim 13, wherein said higher charging pressure is more than 700 psi.

15. The apparatus of claim 14, wherein said higher charging pressure is between 950 psi and 1050 psi.

16. The apparatus of claim 13, wherein said lower charging pressure is 700 or less psi lesser than said higher charging pressure.

17. The apparatus of claim 16, wherein said lower charging pressure is between 5 psi and 550 psi lesser than said higher charging pressure.

* * * * *